Nov. 28, 1967  A. M. KING  3,354,811

BEVERAGE BREWING APPARATUS

Original Filed May 5, 1964  8 Sheets-Sheet 1

Inventor
Alan M. King
By Hofgren, Wegner, Allen, Stellman & McCord
Attorneys

Nov. 28, 1967    A. M. KING    3,354,811
BEVERAGE BREWING APPARATUS
Original Filed May 5, 1964    8 Sheets-Sheet 2

Nov. 28, 1967   A. M. KING   3,354,811
BEVERAGE BREWING APPARATUS
Original Filed May 5, 1964   8 Sheets-Sheet 4

Nov. 28, 1967  A. M. KING  3,354,811
BEVERAGE BREWING APPARATUS

Original Filed May 5, 1964  8 Sheets-Sheet 5

United States Patent Office 3,354,811
Patented Nov. 28, 1967

3,354,811
BEVERAGE BREWING APPARATUS
Alan M. King, Lake Forest, Ill., assignor to Interstate United Corporation, a corporation of Illinois
Continuation of application Ser. No. 365,109, May 5, 1964. This application Dec. 21, 1966, Ser. No. 603,683
9 Claims. (Cl. 99—282)

This application is a continuation of my application Ser. No. 365,109, filed May 5, 1964, now abandoned, which in turn is a continuation-in-part of my application Ser. No. 280,927, filed May 16, 1963, now abandoned.

This invention relates to apparatus for brewing a beverage. More specifically, it is concerned with a beverage preparing machine which includes means for pre-steeping or pre-wetting a ground beverage ingredient and for brewing a small batch, as a single cup, of beverage therefrom. A coffee brewing apparatus is described herein. It will be understood that the invention is applicable to other beverages, as tea for example.

Fresh brew vending apparatus currently employed for dispensing coffee generally are designed to brew a substantial quantity of coffee (ten to fifteen cups or more) and to hold it in readiness for dispensing. At times, long periods elapse between dispensing of individual cups of coffee and the already brewed coffee may become stale and bitter.

Efforts have been made toward the design of machines in which a single cup of coffee is prepared each time the machine is actuated. Many such machines use a powdered soluble or instant coffee which is merely mixed with hot water. The quality of the coffee is generally rather poor. Some vending machines brew a single cup of coffee from ground coffee on each actuation. If the cup of coffee is prepared before the customer has actuated the machine and held until dispensed, the coffee may stand for a long period of time and become stale. If the brewing operation is initiated when the customer actuates the machine, the timing of the brewing operation becomes important. It is undesirable to require more than ten seconds to provide an individual serving from a dispensing machine. A longer cycle ties up the machine excessively and results in dissatisfaction of the customers who must wait in line. In a machine in which ground coffee is mixed with hot water for a brewing operation, the brewing process should be carried on for three to six minutes, at a minimum, to insure the extraction of the full flavor of the coffee bean. It is impractical to use such timing in a coin vending operation. Accordingly, compromises have been made in the machines which are utilized commercially, with the brewing time being reduced and rather unpalatable coffee results. Furthermore, the extraction of solubles is incomplete and the quantity of ground coffee used per cup must be increased. This results in an uneconomic operation. In some machines the ground coffee is divided into two batches and one batch is held from each brewing operation to the next. This may work satisfactorily where the machine receives fairly constant use. However, where the machine is used infrequently, the wet grounds become rancid. For example, a temperature of 80° to 90° F. is common in a vending machine cabinet. Wet ground coffee held at this temperature for an hour shows a noticeable change in flavor of the brewed coffee.

In accordance with the present invention, an apparatus for brewing and vending coffee are provided in which the ground coffee is pre-steeped and maintained at a relatively low temperature in a refrigerated chamber until the machine is actuated by a customer. The final brewing operation is then carried on in a minimum time while still realizing all of the coffee flavor.

It is an object of this invention to provide an improved coffee brewing and vending apparatus.

It is an additional object of this invention to provide a coffee brewing and vending apparatus which brews individual cups of coffee only when the machine is operated.

It is still a further object of this invention to provide a coffee vending and brewing apparatus wherein the grounds for brewing coffee are pre-steeped or pre-wet prior to their use for brewing coffee.

Another object of the invention is to refrigerate the wet coffee prior to use, to prevent deterioration.

It is still an additional object of this invention to provide a new coffee supply system for a one-cup brewing apparatus.

It is yet another object of this invention to provide a coffee vending apparatus including a brew mechanism having unique construction.

Accordingly, one feature of the invention is to provide a ground coffee supply system including a feed apparatus for dispensing pre-steeped grounds to a brewing apparatus and including a chamber in which a small quantity of water is added to the grounds and which allows for expansion of wet grounds during the steeping process.

It is a further feature of one form of the invention to provide hot water to be fed into the brew pot tangentially to the inner periphery thereof, intimately mixing the water and pre-steeped grounds, setting a bed of grounds, and aiding in the cleansing of the brew chamber.

It is an additional feature of the invention to utilize air under pressure to aid in forcing the liquid through the coffee bed and filter paper, and to a dispensing point.

It is yet an additional feature of the invention to provide a cooling means in the coffee feed line between the brew chamber and the dispensing station to reduce the temperature of the coffee received in a cup at the dispensing position so an operator of the vending apparatus may comfortably handle the cup.

It is still a further feature of one form of the invention to provide means for closing and sealing the brew chamber after it has been charged with a portion of grounds and water for brewing coffee, prior to the application of air under pressure.

A further feature of the invention is to provide a measuring cup having two positions, one for receiving pre-steeped grounds and the other for discharging the grounds into a brew chamber.

It is an additional feature of the invention to provide means for cleaning the measuring cup each time pre-steeped coffee is discharged.

Further features and advantages will readily be apparent from the following specification and from the drawings in which:

FIGURE 4 is a sectional view taken generally along line 4—4 of FIGURE 3;

Figure 1:
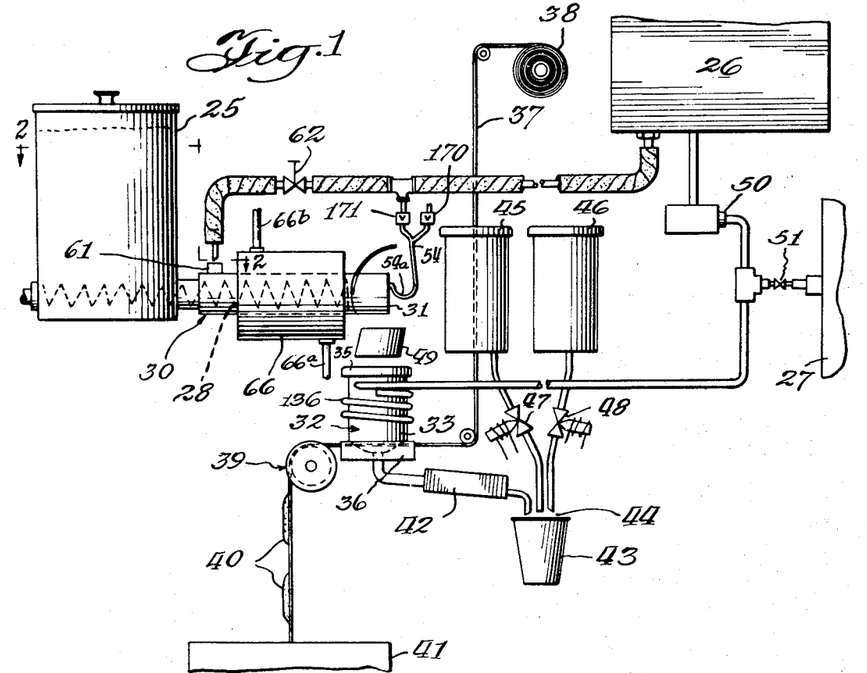
FIGURE 1 is a diagrammatic illustration of an embodiment of the invention.

In the diagrammatic illustration of FIGURE 1, ground coffee is stored in hopper 25. Hot water for brewing coffee is provided from a heating tank 26 which may be supplied with water from a suitable source, as a water main (not shown). Compressed air for use in the brewing operation is supplied from an air tank 27.

Briefly, ground coffee from hopper 25 is moved by auger 28 through the tube 30 where a small quantity of water is added to it, for the pre-steeping operation. The wetted ground coffee is forced by the auger from tube 30 into measuring cup 31 and the operation of the auger is controlled by the quantity of ground coffee in the measuring cup, as will appear.

The brew mechanism, indicated generally as 32, includes a barrel 33, a cover or lid 35 and a base 36. A web of filter paper 37 passes from a filter paper supply 38 over suitable guide rollers and between the barrel 33 and the base 36. A filter paper drive roller 39 is actuated, as will appear, moving a fresh section of filter paper into position before each brewing operation and directing the used filter paper and spent coffee grounds 40 into a waste receiver 41.

The brewed coffee passes through a heat exchanger 42 to a cup 43 located at dispensing position 44, and in which the beverage is delivered to the customer. Cream or sugar may be added to the coffee from supply canisters 45 and 46 through the actuation of valves 47 and 48, respectively.

On actuation of the apparatus by a purchaser, as by depositing a coin in the vending machine, the measuring cup 31 is swung downwardly and the pre-steeped ground coffee flushed out by a combination of water (held in the dip 54a of tube 54) and compressed air, through a guide 49 into the barrel 33 of the brewing mechanism. At the time this occurs, the lid 35 is positioned at one side of the barrel 33 and a clean section of filter paper 37 is located between the barrel and base 36. Hot water flows from tank 26 through valve 50 to the brewing apparatus where it mixes with the pre-steeped ground coffee. After the brew water has been added to the ground coffee in barrel 33, lid 35 is seated, sealing the brewing chamber. Air valve 51 is opened allowing compressed air from tank 27 to enter the brewing chamber, forcing the liquid through the bed of ground coffee, the filter paper and into the cup 43. As a result of the pre-steeping operation, the hot water may readily complete the extraction of the solubles in the coffee and the serving time is minimized. When all of the liquid coffee has been discharged from the brewing chamber, cover 35 swings away, barrel 33 lifts and filter paper 37 is advanced, positioning a fresh section of the paper over the base 36. The barrel is then reseated and the apparatus is ready to repeat the cycle.

As measuring cup 31 returns to the position shown in FIGURE 1, the auger 28 is driven refilling the cup with pre-steeped ground coffee for the next brewing operation.

Figure 2:
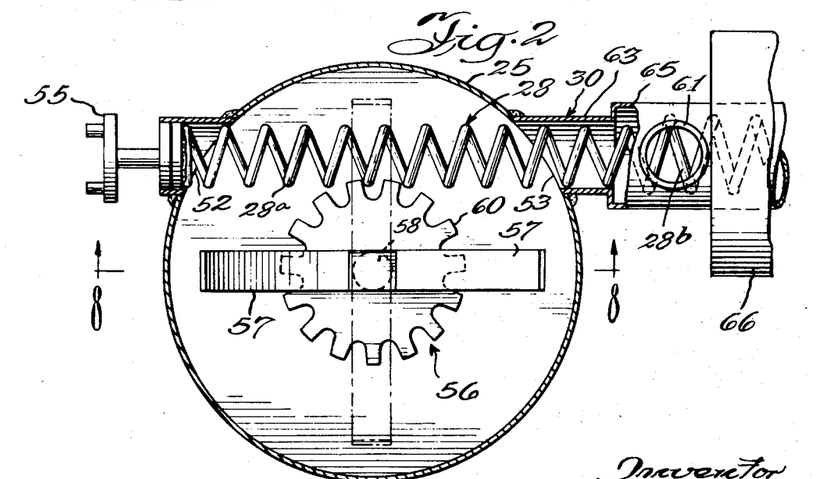
FIGURE 2 is a sectional view taken generally along line 2—2 of FIGURE 1.
Figure 8:
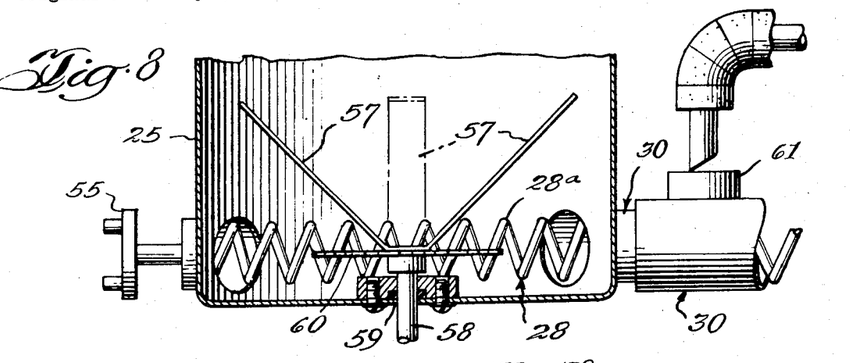
FIGURE 8 is a fragmentary sectional view taken generally along line 8—8 of FIGURE 2.

Turning now more particularly to FIGURES 2 and 8, it will be seen that auger 28 extends through openings 52 and 53 in the wall of coffee hopper 25. One end of auger 28 is provided with a clutch plate 55 for connection with a drive motor, not shown. Rotatably mounted within the hopper 25 is agitator 56 which has arms 57 fastened to a shaft 58 recieved in a bearing 59. A gear 60 has a series of teeth engageable with auger 28 and is rigidly fastened to shaft 58. Thus, when auger 28 is rotated, the agitator turns distributing the ground coffee within hopper 25 and breaking up any lumps which might tend to form. A separate motor may be used for the agitator.

Rotation of the auger moves the ground coffee from the hopper through tube 30 to the measuring cup 31. At the end of tube 30 adjacent hopper 25 is a water inlet port 61 through which the pre-steeping water is added to the ground coffee. As will appear, water valve 62 is actuated upon each operation of the machine to cause the desired amount of hot pre-steeping water to flow from tank 26 to the inlet port 61. Ground coffee upon being wetted has a tendency to swell. Accordingly, tube 30 has a short section 63 of a first diameter joined to the hopper 25 and a second section 65 of a larger diameter extending from the water inlet port 61 to the measuring cup 31. Auger 28 likewise has a section 28a of a first diameter within the hopper 25 and tube section 63 and a section 28b of a larger diameter within tube section 65. The pitch of the turns of auger section 28b is less than the pitch of section 28a and the quantity of ground coffee moved by auger portion 28a is insufficient to fill tube section 65, eliminating the problem of the wet ground coffee jamming.

A refrigeration jacket 66 surrounds tube 30 keeping the temperature low, as 35° to 40° F., even though the interior of the brewing and dispensing housing may be over 100° F. The pre-stepped coffee has a tendency to oxidize, destroying the flavor of the beverage which will be prepared. At a temperature of the order of 37°–40° F., the pre-steeped coffee will remain fresh for several days, at least. The refrigeration jacket 66 has inlet and outlet ports 66a and 66b connected with a suitable refrigerating means (not shown).

Figure 12:
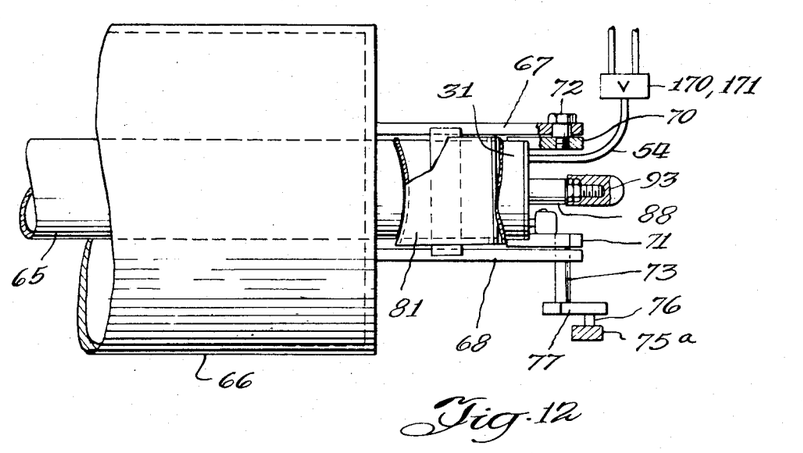
FIGURE 12 is a fragmentary plan of the measuring cup of FIGURE 6.
Figures 13, 14:
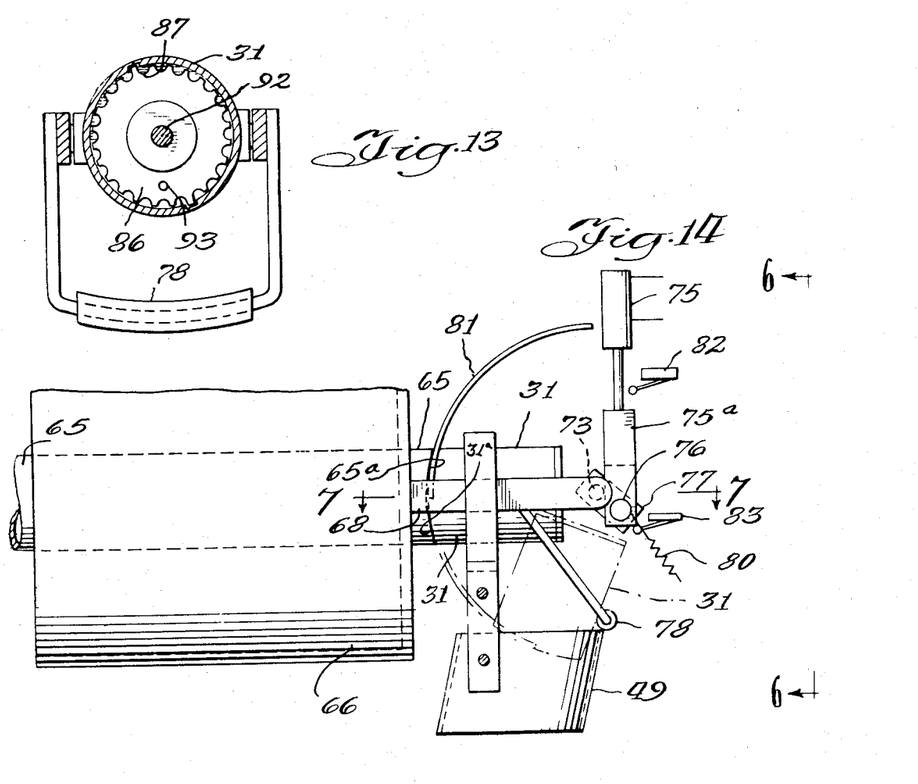
FIGURE 13 is a section taken generally along line 13—13 of FIGURE 7.
FIGURE 14 is a detailed side view of the measuring cup.
Figure 15:
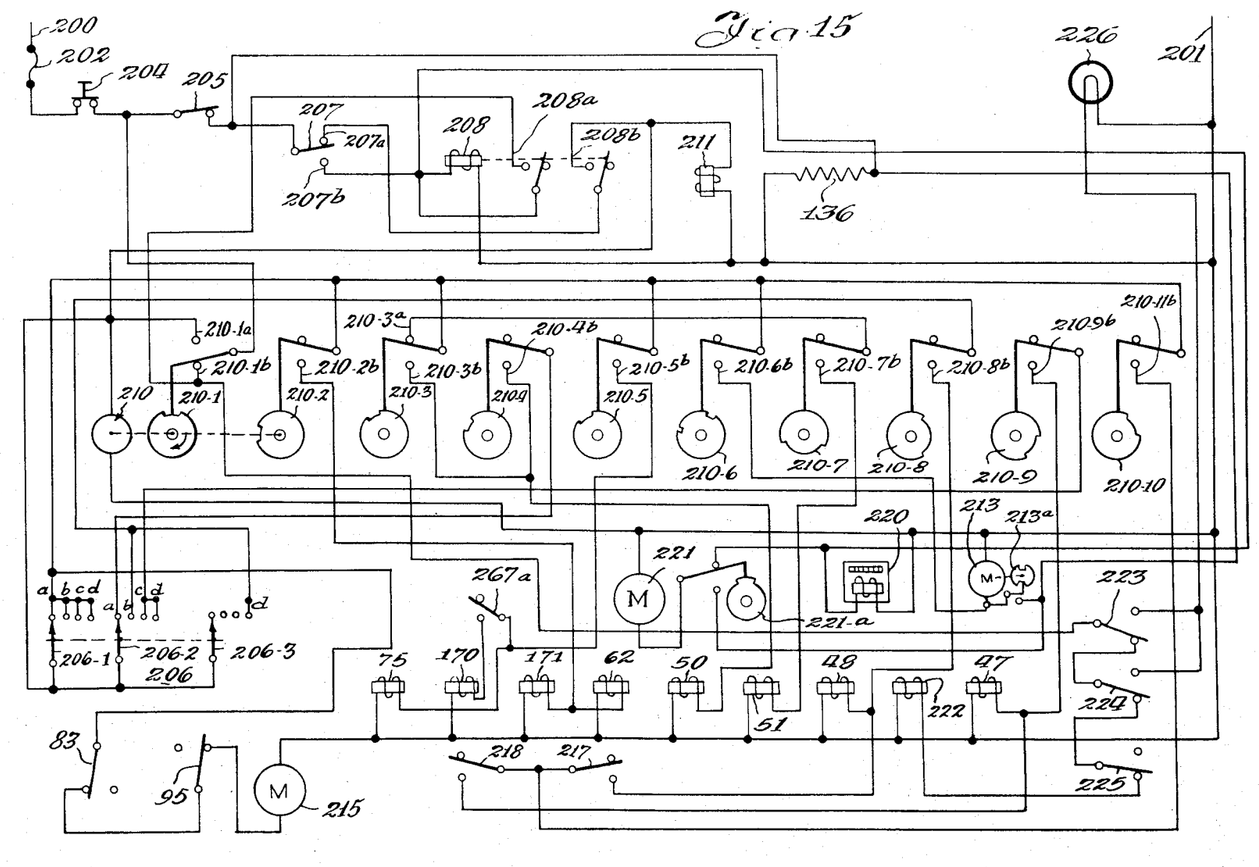
FIGURE 15 is a schematic diagram of the electrical control circuit of the apparatus.

Measuring cup 31, its mounting, actuating apparatus and internal structure, are shown in various of the figures. As best seen in FIGURES 12 and 14, brackets 67 and 68 extend outwardly from the end of refrigeration jacket 66. Measuring cup 31 is provided with support arms 70 and 71, arm 70 being pivotally connected with bracket 67 through a shouldered screw 72 and arm 71 having a drive shaft 73 connected therewith and extending through bracket 68. Measuring cup 31 is movable from a receiving position shown in solid lines in FIGURE 14 to a discharging position shown in broken lines. The measuring cup is actuated by a solenoid 75 which has an armature 75a connected by pin 76 with crank 77 secured to drive shaft 73. When the solenoid is energized, the armature is drawn upwardly swinging the measuring cup 31 downwardly against stop 78. The wet ground coffee is then discharged, as will appear in more detail below. A return spring 80 has one end connected with solenoid armature 75a and the other anchored to the frame of the machine (not shown). When the energizing circuit for solenoid 75 is broken, spring 80 returns measuring cup 31 to its solid line position.

Measuring cup 31 has a curved end portion 31a designed to mate with the end portion 65a of tube section 65. A sealing gate 81 is secured to the upper portion of the open end of measuring cup 31 and has a curavture which matches the curved end of tube section 65. As the cup is rotated from the horizontal to the dispensing position, sealing gate 81 closes the end of tube section 65 holding the wet ground coffee therein. Switches 82 and 83, associated with solenoid armature 75a, are actuated by the armature at the ends of its travel, and form a part of the control circuit, as will be explained in more detail below.

Figures 5, 6, 7:
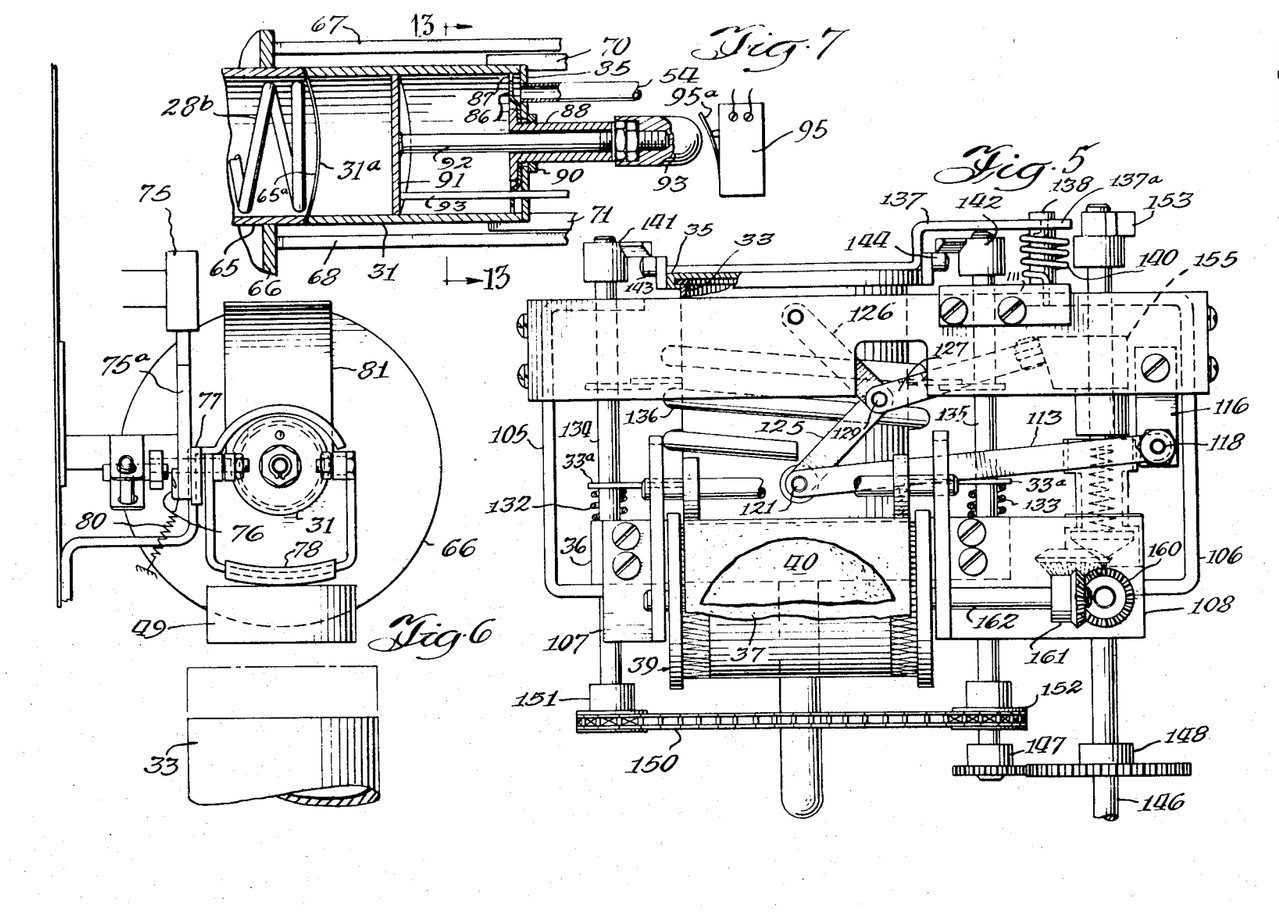
FIGURE 5 is an elevation of the brew pot station taken from the bottom of FIGURE 3, showing the brew pot in the closed position.
FIGURE 6 is an elevation of the end of the measuring cup taken generally along line 6—6 of FIGURE 14.
FIGURE 7 is a fragmentary transverse section taken generally along line 7—7 of FIGURE 14.

With particular reference to FIGURES 7 and 13, it will be seen that the measuring cup is generally cylindrical in cross-section and has its end closed by an end plate 85. Tube 54 is connected to end plate 85 to introduce water and compressed air to flush the wet ground coffee from the measuring cup to the brewing apparatus 32. A dished baffle plate 86 having a serrated edge 87 is held against end plate 85 by a bushing 88 secured in place by lock nut 90. A pressure plate 91 which has a curved surface parallel with the curved end 65a of tube section 65, is carried by a rod 92 extending through bushing 88. Guide rod 93, attached to plate 91, extends through the rear of cup 31 preventing rotation of the pressure plate. As the ground coffee is driven by auger 28 into measuring cup 31, it moves pressure plate 91 and rod 92 to the right until switch actuator 93 threaded to the end of the rod strikes the operating arm 95a of switch 95 and stops the auger drive motor.

A plastic coating, as of Teflon, is applied to the inside cup 31 and the surface of pressure plate 91 to permit easy movement of the wet ground coffee into the cup and to facilitate flushing thereof during discharge of the ground coffee into the brewing mechanism.

On actuation of the beverage brewing apparatus, the measuring cup 31 is moved to the broken line dispensing position shown in FIGURE 14, cutting off the pre-steeped coffee grounds in the end of tube section 65 so that the grounds left therein have a configuration corresponding with a curved face of pressure plate 91. This complementary curved relationship provides for complete and even filling of the measuring cup upon each operation of the machine.

When the cup 31 is in a position to deliver the wet ground coffee into the brewing apparatus, water and compressed air are forced through tube 54 into the space behind plate 86 and pass through the apertures of the serrated edge 87. The wet ground coffee in the measuring cup is washed through guide 49 into the brewing apparatus and pressure plate 91 is moved to the left. The cup is left clean and ready to be refilled.

The brewing mechanism is best seen in FIGURE 3 through 5 and 9 through 11. Referring first to FIGURE 4, it will be seen that the barrel 33 is a generally cylindrical member, the bottom edge of which rests on filter paper 37 with a seal being formed against a resilient washer 100 carried by base 36. A filter screen 101 underlies and supports the filter paper.

The upper top frame members 102 and 103 of the brewing mechanism are secured to the frame of the machine (not shown). Base support brackets 105 and 106 extend downwardly from the upper frame members 102 and 103 and carry the base 36. Angle brackets 107 and 108 extend outwardly from the base and carry filter paper drive roller 39. Plate 111 spans upper frame members 102 and 103 and provides support for a portion of the drive mechanism as will appear.

Figure 3:
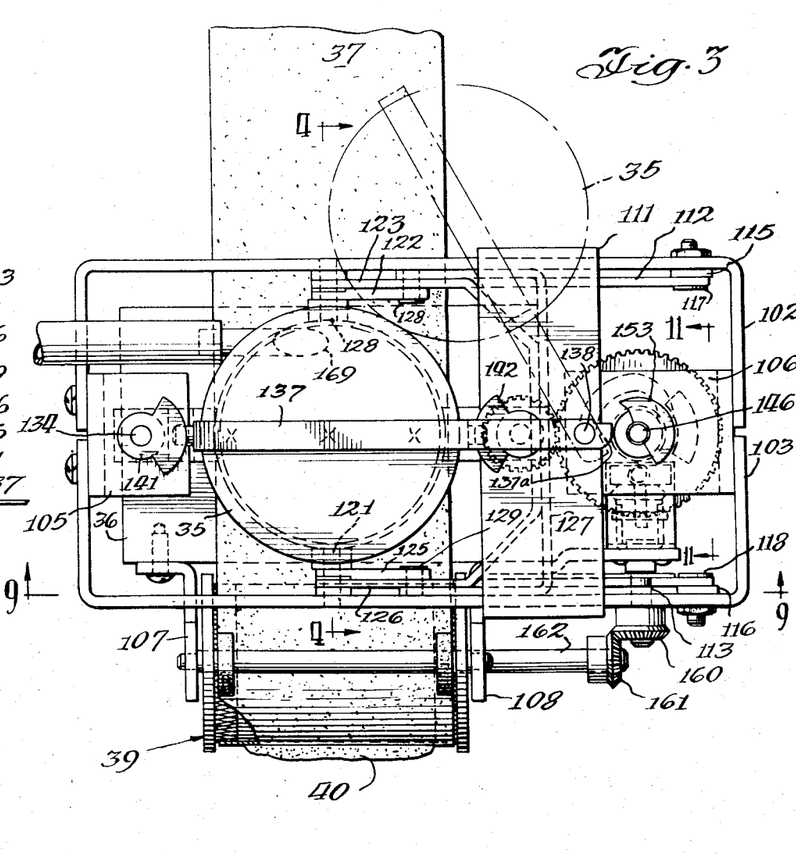
FIGURE 3 is a plan view of the apparatus at the brewing station.

Barrel 33 is carried by arms 112 and 113 pivoted to plate 115 and 116 by screws 117 and 118 (FIGURES 3 and 5). Barrel support arms 112 and 113 are fastened to the barrel 33 by shouldered screws 120 and 121. Two pairs of barrel locking links 122, 123 and 125, 126 connect screws 120, 121 with upper frame members 102 and 103. A U-shaped pressure member 127 joins pivot screws 128, 129 (between the links 122, 123 and 125, 126, respectively) and has cam follower rollers 131 mounted in the center thereof. The barrel 33 is urged upwardly by springs 132, 133 seated on base 36 and acting against bearing plates 33a extending outwardly from the barrel and slidable on cover locking shafts 134 and 135. An electric heater 136 surrounds barrel 33 to maintain the temperature of the brewing water during the brewing operation.

The cover is carried by a strap 137 pivotally mounted on a pin 138 extending upwardly from plate 111. Spring 140 lifts cover 35 and has its ends extending into holes in plate 111 and strap 137, urging the cover in a counter-clockwise direction as viewed in FIGURE 3 to a position over barrel 33. Locking cams 141, 142 on rotatable shafts 134, 135, engage lugs 143, 144 extending outwardly from cover 35 to seal it in closed position during the brewing operation.

The brew mechanism is driven by a single motor (not shown) which turns drive shaft 146 in a counterclockwise direction as viewed in FIGURE 3. Drive shaft 146 is rotatably mounted in base support bracket 106. Cover locking shaft 135 has a gear 147 in mesh with gear 148 on the drive shaft while cover locking shaft 134 is driven through chain 150 and sprockets 151, 152 on the two covering locking shafts. Cam 153 at the top of drive shaft 146 engages the end 137a of lid strap 137 to swing the lid to the broken line position of FIGURE 3 during a portion of the operating cycle. Cam 155 on drive shaft 146 operates against rollers 131 to move pressure member 127 to the left locking the barrel in sealed position against filter paper 37.

Filter paper drive roller 39 is also operated from drive shaft 146. Partial gear 156 (FIGURE 11) has teeth extending for approximately one-quarter of its circumference. During a portion of its rotation, the teeth mesh with gear 157 on shaft 158 which in turn carries gear 160 in mesh with gear 161 on the filter paper drive roller shaft 162, thus turning filter paper drive roller 40. Lock plate 163 has a pin 165 which slides in slot 166 of mounting plate 167. Spring 168 urges lock plate 163 down into engagement with gear 157 holding the filter paper drive against movement when the gears are not in mesh. As gear 156 moves into mesh with gear 157, the upper surface 156a thereof lifts lock plate 163 and releases the filter paper drive. In addition, lock plate 163 insures proper mesh of partial gear 156 with gear 157 and prevents jamming of the brew mechanism drive.

Before the initiation of a coffee brewing operation barrel 33 is seated on a fresh section of filter paper 37. Lid 35 is held in the broken line position of FIGURE 3 by cam 153. When the machine is operated, dispensing cup 31 discharges the pre-steeped ground coffee into the open top of barrel 33. The brew mechanism motor is started and drive shaft 146 turns in the counterclockwise direction. As cam 153 releases cover 35, it is caused to swing back to a position over barrel 33 by spring 139. Cover locking cams 141 and 142 engage cover lugs 143 and 144 sealing the cover to the top of the barrel. The brew mechanism motor then stops. Hot brewing water and compressed air are then admitted to the brewing chamber and coffee delivered to the customer. Following the brewing operation, cover locking cams 141 and 142 release the cover which is lifted by spring 139 and swung out of the way by cam 153. Barrel cam 155 releases pressure member 127 permitting springs 132 and 133 to lift barrel 33. Partial gear 136 releases lock plate 163 and engages with gear 157 driving the filter paper and used coffee grounds from their position on base 36 toward the waste container. Barrel cam 155 again acts against pressure member 127 seating barrel 33 on a fresh section of filter paper and the apparatus is in condition for further brewing operation.

The brewing water and air enter the brewing chamber through opening 169 which is substantially tangential with the wall causing a swirling action within the chamber. This intimately mixes the hot water and ground coffee and sets the grounds in a bed on the filter paper so that they are left in a mound formation after the water is expelled by the compressed air. As a result, the barrel itself is substantially free of grounds and need not be flushed following each brewing operation.

Figures 9, 10, 11:
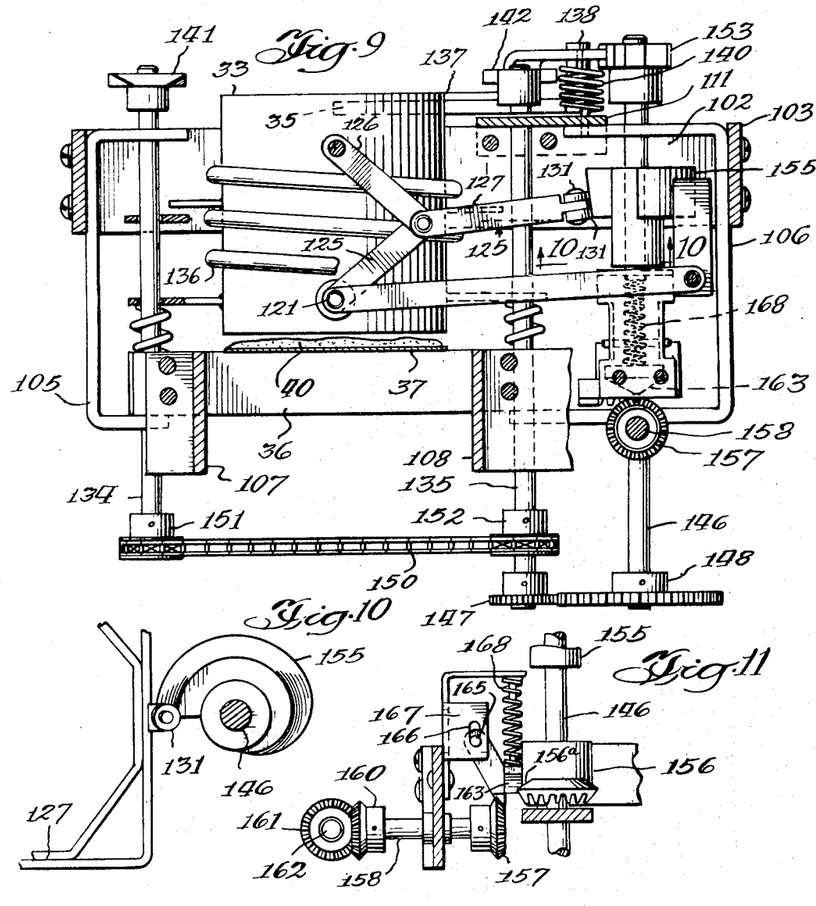
FIGURE 9 is a sectional view taken generally along line 9—9 of FIGURE 3.
FIGURE 10 is a sectional view taken generally along line 10—10 of FIGURE 9.
FIGURE 11 is a fragmentary view taken generally along line 11—11 of FIGURE 3.
Figure 11:
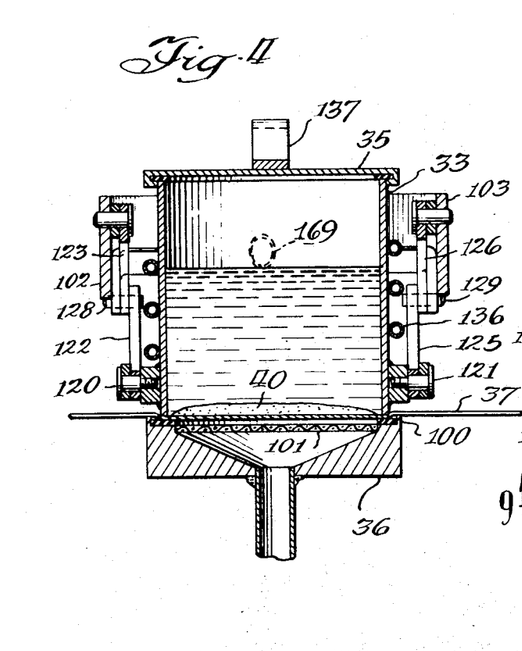

The electrical control and operating circuitry for the apparatus will now be described with reference to the schematic diagram in FIGURE 10. The circuit is energized through power leads 200, 201 which may be connected with a suitable source of power, as 110 volts AC (not shown). Line 200 is provided with a fuse 202, and main power switch 204. The major portion of the circuit is energized through overflow switch 205 associated with the waste tank of the apparatus in which all spilled liquid is collected. If the level in the waste tank becomes too high, switch 205 opens shutting down the machine.

The first step in the operation of the machine is selection by the customer of the desired beverage as black coffee, coffee with sugar, coffee with cream or coffee with cream and sugar. This selection is made with a three-section, four-position switch 206, the four positions from left to right in the drawing, corresponding with the four beverages specified above, respectively.

Operation of the machine is initiated by the insertion of a coin in a suitable coin mechanism (not shown in detail). The coin moves double throw switch 207 from position 207a to position 207b completing a circuit from line 200 energizing coin relay 208. Contact 208a closes completing a holding circuit for the relay through a switch 210–1b associated with the cycle cam 210–1 of sequence timer 210. Switch 207b is closed only momentarily by the passage of the appropriate coin and as it reopens, contact 207a closes. A circuit is completed through contact 207a and relay contact 208b energizing the drive motor for timer 210 and switch lock solenoid 211 which mechanically prevents the customer from changing the position of the switch 206 during the dispensing operation. Connected with timer 210 are ten cams, 210–1 to 210–10 each of which is rotated in a clockwise direction and operates an associated switch to perform the various beverage brewing and dispensing functions. The initial movement of the timer opens switch 210–1b and closes a holding contact 210–1a maintaining the energization of the timer motor and the switch lock solenoid. At the same time, the holding circuit for coin relay 208 is broken and it returns to the unenergized condition.

At the start of the dispensing operation, the brew chamber cover 35 is open with a length of fresh filter paper 37 in position. As the timer cam is rotated in a clockwise direction, cup delivery cam 210–5 closes switch 210–5b energizing measuring cup delivery solenoid 75. Solenoid 75 pulls measuring cup 31 down and closes air flush switch 267a. Valve 170 is opened admitting air to hose 54 forcing water standing therein into delivery cup 31 washing the pre-steeped ground coffee therein down into the brew chamber. Continued rotation of cam 210–5 opens switch 210–5b breaking the energization circuit for solenoid 75 and valve 170.

The double throw switch associated with coffee water cam 210–3 closes switch 210–3b, energizing coffee water valve 50 to admit brew water to the chamber. Before switch 210–3b opens, switch 210–4b closes and, in the black coffee position of selector switch 206, provides a secondary energization circuit for water valve 50 through section 206–2 of the selector switch, contact a. This adds a small amount of coffee brewing water where neither cream nor sugar is added. After delivery of the brew water, cam 210–6 closes brew motor impulse switch 210–6b energizing brew motor 213, which drives the brew mechanism to close the cover. When cam 210–3 closes switch 210–3a at the end of the main brew water period and the cover is closed, a circuit is completed through contact 210–3a and contact 210–7b associated with the air valve cam 210–7, energizing the air valve 51. Compressed air is admitted to the brew chamber, forcing the liquid through the coffee and filter paper 37, into cup 43.

As switch 210–7b opens, closing air valve 51, brew motor impulse switch 210–6b closes a second time restarting brew motor 213 opening the brew chamber, lifting barrel 33, advancing the used filter tape and coffee grounds, and reseating the barrel. Cycle cam 213a which controls the holding circuit for brew motor 213 has two stopping positions, corresponding with the closed or brewing condition and the open position from which brewing is initiated.

Cam 210–2 closes switch 210–2b immediately after the release of coffee delivery solenoid 75 and flush air valve 170. Closure of switch 210–2b energizes pre-steep water valve 62 and flush water valve 171, the latter allowing a quantity of water to flow into hose 54, ready for the brewing and dispensing operation.

As the energization circuit of coffee delivery relay 267 is broken and the coffee measuring cup 31 returns to its horizontal position, coffee delivery switch 83 is closed. A circuit is completed from the timer motor power circuit through section 206–1 of the selector switch, coffee delivery switch 83 and delivery cut-out switch 95 energizing motor 215 which drives the coffee delivery mechanism, forcing pre-steeped grounds from tube 30 into delivery cup 31. When the cup is filled with the appropriate quantity of soaked ground coffee, as determined by the setting of actuator 93, switch 95 opens breaking the circuit for coffee transport motor 215. This operation is completed prior to the termination of the dispensing operation itself so that the apparatus is ready to repeat the brewing and dispensing cycle immediately.

At the end of the dispensing operation, holding switch 210–1a opens stopping the timer motor and at the same time closing switch 210–1b reestablishing a circuit to switch 208a of the vend relay.

If the beverage selector switch is set for position b, coffee with sugar is dispensed. A circuit is completed through switch 206–2b and timer switch 210–8b to operate the sugar control valve 48. In this switch position, extra water is not added as switch 206–2a is open and there is no energization circuit to switch 210–4b. In position c of selector switch 206, a circuit is completed through contact 206–2c and timer switch 210–9b energizing cream valve 47. In position d of switch 206, the cream circuit is completed through section 206–2d and the sugar circuit through switch 206–3d. Extra portions of either cream or sugar may be obtained by closing extra sugar switch 217 or extra cream switch 218. These switches obtain power through timer switch 210–10b.

Energization of vend relay 208, at the start of the dispensing operation, also energizes a drink counter 220, and cup dispenser motor 221, both connected in parallel with the vend relay. The cycling of cup dispenser motor 221 is controlled by cam 221a.

A coin reject mechanism is provided including a reject solenoid 222, which, when not energized, diverts deposited coins through a coin return. The mechanism for accomplishing this is well known and not shown in detail. The circuit for coin reject solenoid 222 is completed through timer cycle cam 210–1b, open during a dispensing operation, cup empty switch 223, water sold-out switch 224, associated with the water tank and switch 225 associated with the cup handling mechanism and open when a malfunction occurs. Actuation of any of the switches from the position shown in the drawing breaks the circuit for coin reject solenoid 222 and prevents operation of the machine. In the event of depletion of the cup or water supply, switches 223 or 224 close a circuit energizing sold-out light 226.

In one commercial embodiment of the invention, the total elapse time between depositing a coin by the customer and completion of delivery of coffee into the cup is ten to eleven seconds. Of this time, four seconds are utilized to flush the wet ground coffee into the brewing chamber, introduce the additional brewing water and seal the lid. The compressed air valve is opened and the liquid completely expelled from the brewing chamber eight seconds after the coin is deposited. All of the coffee (and cream or sugar if desired) is in the cup within ten to eleven seconds.

Approximately seven grams of ground coffee are used for a serving. To this, ten cubic centimeters of water is added in the pre-steeping operation. This quantity of water is readily absorbed by the ground coffee and there is little, if any, free water in tube 30. One hundred fifty to one hundred sixty cubic centimeters of water are added in the brewing chamber. A presteeping period of the order of at least three to four minutes is desirable to achieve the desired degree of extraction of the beverage ingredients from the grounds although the soaked coffee grounds may be held in refrigerated tube 30 for several days without deterioration. In the described apparatus, which brews and dispenses a serving of coffee in ten to eleven seconds, four customers may be served in a minute. Refrigerated tube 30 has sufficient volume to hold wetted grounds for twelve cups. Thus, a pre-steeping period of at least three minutes is provided even if the machine is operated continuously.

The apparatus of FIGURES 1 through 14 has been found to have certain problems. Measuring cup 31 is not sufficiently refrigerated and pre-steeped ground coffee which stands therein for an excessive length of time may become stale. Secondly, as the measuring cup 31 is flushed, there is a tendency for coffee and water to splash about the interior of the apparatus. Furthermore, the heated brewing chamber is relatively inefficient and presents operating problems. These objections are overcome in the modified apparatus illustrated in FIGURES 16, 17 and 18.

The coffee steeping tube 300 is connected with a ground coffee hopper (not shown). The ground coffee is moved through the tube by auger 301 driven by a coffee delivery motor (not shown). Pre-steeping water is added at an inlet port 302. Measuring cup 303 is pivotally supported on integral extensions 305 and 306 and can be swung to the broken line delivery position of FIGURE 16 by rotary solenoid 307. Sealing gate 308 closes the end 310 of tube 300 during delivery of the pre-steeped grounds to the brewing mechanism.

Figure 16:
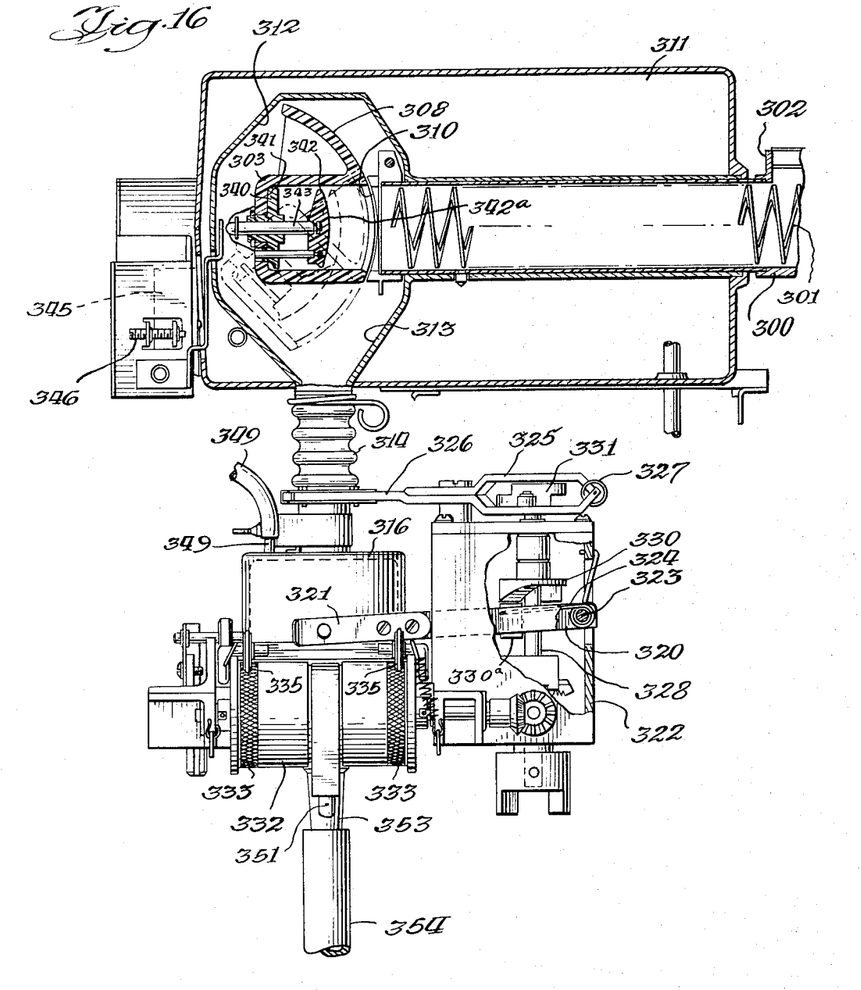
FIGURE 16 is an elevation, partially in section, of a modified brewing apparatus.

Refrigerated jacket 311 which extends around tube 300 also extends beyond the end of measuring cup 303 and has a chamber 312 therein within which the measuring cup and sealing gate 308 are received. Refrigerated jacket 311 is preferably formed of two sections for easy removal from the tube and measuring cup. The lower portion 313 of chamber 312 serves as a funnel to direct ground coffee and flush water into a flexible, bellows-like tube 314 which is connected thereto and has a lower end connected to the top of brew chamber cover 316. Cover 316 is shown seated on base 317 and sealed with filter paper 318 supported by screen 319. The filter paper comes from a roll supply and, following use, is discharged along with the used coffee grounds into a waste container.

Cover 316 is removably mounted on arms 320 and 321 which are pivoted to the drive mechanism housing 322 at 323. Cover 316 is urged upwardly by a spring 324. The interior of cover 316 is lined with a plastic material 316a which is a poor heat conductor. Thus, the brewing water is not substantially cooled during the brewing operation and it is necessary to provide only moderate heat to the brew mechanism as by a heater 317a under base 317.

A pinch valve is formed by pivoted arms 325, 326 mounted on the top of drive mechanism housing 322. The pinch surfaces 325a and 326a are separated by spring 327 connected between the opposite ends of the pivoted arms.

Brew mechanism drive shaft 328 has mounted thereon a cover operating cam 330 which acts against a roller 330a mounted on cover supporting arms 320, 321. During a portion of the rotation of shafts 328, cam 330 acts to hold the cover 316 in sealed engagement with the filter paper. Pinch valve cam 331, also mounted on shaft 328, acts against arms 325 and 326 forcing the ends 325a and 326a together, closing off flexible tube 314.

Filter tape drive roller 332 has roughened surfaces 333 against which the filter paper is held by spring urged rubber surfaced rollers 335, providing a positive drive to the filter paper. The filter paper drive mechanism is substantially the same as that described in connection with FIGURES 5 and 11 and is not shown in detail.

Figure 18:
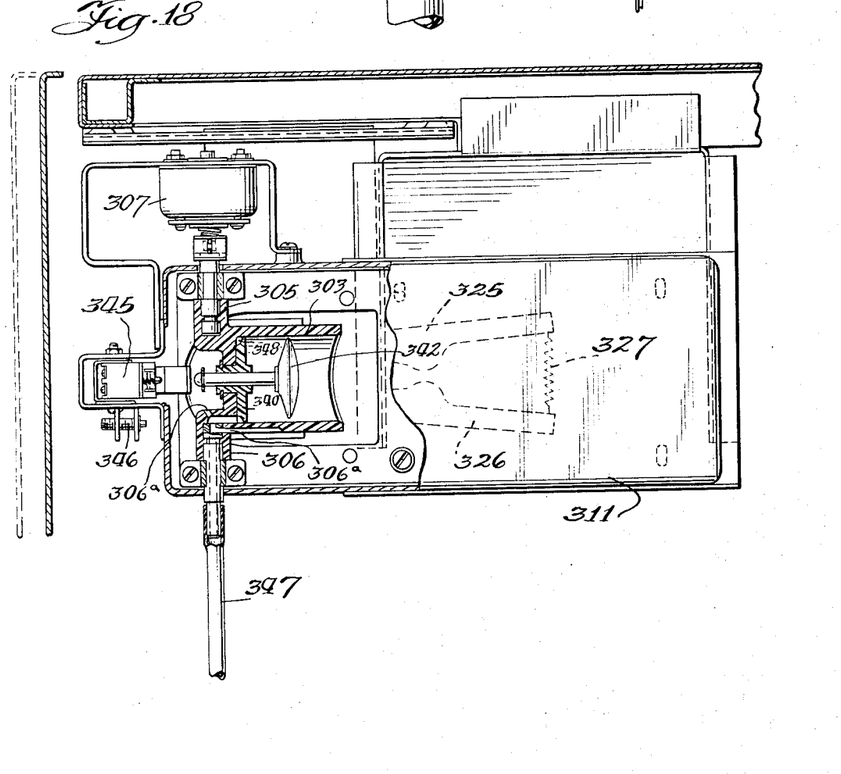
FIGURE 18 is a fragmentary horizontal section through the measuring cup of FIGURE 16.

Measuring cup 303 has mounted therein a baffle plate 340 with a serrated edge 341. Pressure plate 342 is mounted on a rod 343 slidably received in plate 340 and extending out of the end of the measuring cup. The surface 342a of plate 342 is parallel with the end 310 of tube 300 as in FIGURE 7. Rod 434 actuates coffee delivery cutout switch 345 when the appropriate quantity of pre-steeped coffee grounds have been moved into the measuring cup 303 by auger 301. The position of switch 345 may be adjusted by screw 346.

Water and compressed air to flush the pre-steeped coffee grounds from measuring cup 303 are introduced from tube 347 (FIGURE 18) through hollow shaft 306 into the peripheral space 348 behind plate 340. A portion of the flush water is sprayed out through ports 306a, washing the interior of chamber 312 and funnel 313.

Figure 17:
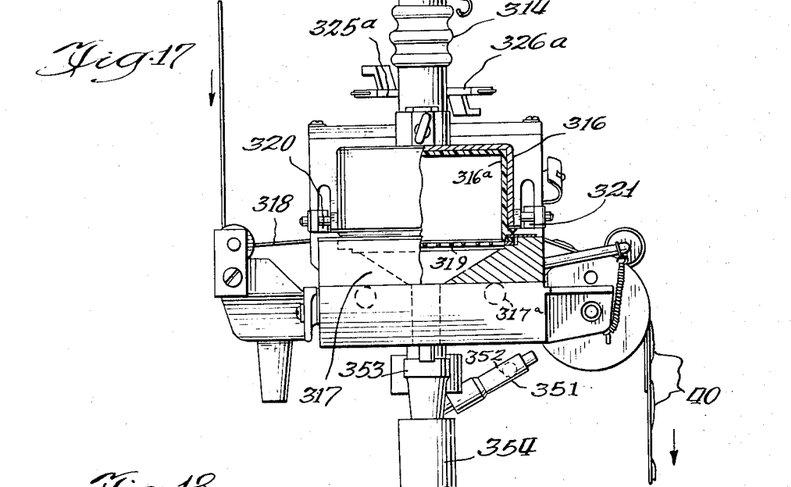
FIGURE 17 is a front elevation of the brewing apparatus of FIGURE 16.

The operation of the apparatus of FIGURES 16 through 18 is substantially the same as that of the apparatus of FIGURES 1 through 14. At the start of the brewing cycle, brewing chamber cover 316 is seated on a fresh section of filter paper and clamp fingers 325a and 326a are separated. Upon initiation of the brewing operation, rotary solenoid 307 is energized swinging measuring cup 303 to the broken line position of FIGURE 16. Water standing in tube 347 is forced by compressed air into the measuring cup. The measured pre-steeped ground coffee is flushed from measuring cup 303 into funnel 313, through flexible hose 314 and into the brewing container. Thirty to forty cubic centimeters of water flow are flushed through the measuring cup after the compressed air to wash both the cup and chamber 312. The brewing mechanism motor (not shown) turns shaft 328 closing the pinch valve on flexible hose 314. Hot brewing water is admitted to the brewing chamber through hose 349, connected with a nipple 350 in the top of the cover, mixing with the ground coffee. After the brewing water has been mixed with the ground coffee, compressed air is admitted to speed the passage of the liquid through the bed of ground coffee and the filter paper.

An air inlet 351 with a pressure operated check valve 352 is connected with outlet nipple 353 to permit rapid flow of the brewed coffee through the hose 354 to the dispensing point.

The brewing mechanism motor is again energized, releasing the clamp valve on tube 314 and allowing cover 316 to lift from the filter paper. The used filter paper and spent ground coffee are moved from the brewing mechanism and a clean section of paper positioned over the screen. The cover is again seated and the motor stops, leaving the mechanism in position for the next operation.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a beverage brewing apparatus including a beverage brewing chamber having a filtered outlet;

a supply of particulate, insoluble beverage ingredient;

a source of brewing water connected with said brewing chamber;

means for applying pressure to the interior of said chamber to force liquid through the filter; and means for measuring a charge of ground beverage ingredient, the improvement which comprises:

means for directing a charge of ground beverage ingredient from said measuring means to said brewing chamber; and means connected with said water source for mixing a quantity of water, less than that required to brew the beverage, with the charge of ground beverage ingredient before it reaches the brewing chamber.

2. The beverage brewing apparatus of claim 1 in which the water mixing means includes means for directing water to said measuring means.

3. The beverage brewing apparatus of claim 2 in which the charge measuring means includes a cup and the water mixing means directs the water into the cup to wash the charge of beverage ingredient into the brewing chamber.

4. The beverage brewing apparatus of claim 3 in which the measuring cup is pivotally mounted above the brewing chamber and is moveable between a filling position and a downwardly inclined discharge position.

5. The beverage brewing apparatus of claim 2 in which the measuring means is above the brewing chamber and having a funnel between the measuring means and the brewing chamber to direct the water-ground ingredient mixture to the brewing chamber.

6. The beverage brewing apparatus of claim 5 wherein the brewing chamber has a moveable cover with an inlet opening and including a flexible tube connected between the funnel and inlet opening of the cover.

7. The beverage brewing apparatus of claim 6 including a pinch valve for sealing said flexible tube, and operating means for moving said cover and operating said valve in timed relation.

8. The beverage brewing apparatus of claim 1 in which the beverage brewing chamber includes a base member with an outlet and a web of filter material extending across said outlet.

9. The beverage brewing apparatus of claim 8 in which the brewing chamber is generally circular in cross section and in which the source of brewing water is connected with said chamber at a point offset from the axis thereof.

References Cited
UNITED STATES PATENTS

| | | | |
|---|---|---|---|
| 228,889 | 6/1880 | Gue et al. | 99—71 |
| 270,787 | 6/1883 | Groff | 99—71 |
| 399,803 | 3/1889 | Wagner | 99—286 |
| 1,063,188 | 6/1913 | De Simone | 99—286 |
| 1,665,728 | 4/1928 | Canright | 99—283 |
| 2,088,966 | 8/1937 | Lyons | 99—71 |
| 2,587,556 | 2/1952 | Weiss et al. | 99—289 |
| 2,589,336 | 3/1952 | Burgess | 99—289 |
| 2,783,149 | 2/1957 | Epstein | 99—171 |
| 2,839,988 | 6/1958 | Tritt | 99—282 |
| 2,910,928 | 11/1959 | Rota | 99—291 X |
| 3,046,869 | 7/1962 | Reynolds | 99—289 |
| 3,120,440 | 2/1964 | Ross | 99—71 |
| 3,203,340 | 8/1965 | Totten | 99—289 |

FOREIGN PATENTS

| | | |
|---|---|---|
| 565,620 | 11/1944 | Great Britain. |

ROBERT W. JENKINS, *Primary Examiner.*